United States Patent Office.

GEORG KOERNER, OF LUDWIGSHAFEN-ON-THE-RHINE, BAVARIA, ASSIGNOR TO THE BADISCHE ANILIN AND SODA FABRIK, OF MANNHEIM, GERMANY.

RED DYE.

SPECIFICATION forming part of Letters Patent No. 429,350, dated June 3, 1890.

Application filed March 3, 1890. Serial No. 342,458. (Specimens.) Patented in Germany March 22, 1889, and in England August 27, 1889, No. 13,558.

*To all whom it may concern:*

Be it known that I, GEORG KOERNER, a subject of the Grand Duke of Hesse, residing at Ludwigshafen-on-the-Rhine, in the Kingdom of Bavaria and Empire of Germany, have invented new and useful Improvements in the Manufacture of a New Dye-Stuff, which fixes itself on cotton without the aid of a mordant, (for which I have obtained Letters Patent in Great Britain, No. 13,558, dated August 27, 1889, and in Germany, dated March 22, 1889,) of which the following is a specification.

My invention relates to the manufacture of a new dye-stuff from orthometa-tolidine and naphthionic acid, which dyes unmordanted cotton a bright-red color of a yellower shade than that obtained with the corresponding so-called "Congo" and "benzopurpurin" dye-stuffs obtained by the combination of naphthionic acid with benzidine and ortho-tolidine, respectively.

My said coloring-matter belongs to the class of so-called "diazo compounds," (that is, bodies which contain the —N=N— group twice,) and is chemically a sodium salt of a sulpho-acid with the composition represented by the formula

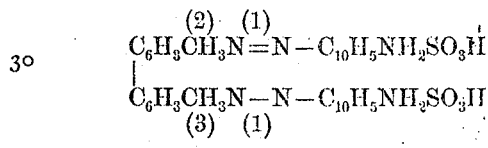

The following is an example of the manner in which my invention is or may be carried into practical effect: About ten (10) parts (by "parts" here and hereinafter are meant parts by weight) of orthometa-tolidine sulphate (*Schultz, Ber. d. Deutsch. Chem. Ges.*, XVII, 470) are well stirred with about eighteen and a half (18.5) parts of hydrochloric acid containing about twenty-five per cent. of free hydrochloric acid (H Cl) and about three hundred (300) parts of water and one hundred (100) parts of ice, and into this about four and a half (4.5) parts of sodium nitrite (containing about ninety-six per cent. pure sodium nitrite $NaNO_2$) dissolved in about nine (9) parts of water are slowly run, and the stirring is subsequently continued for about two hours, during which time, as during the whole reaction, the temperature should be kept at about 0° centigrade. The tetrazo compound thus obtained is next poured into a solution of about twenty-two and a half (22.6) parts of crystallized naphthionate of soda and about twenty (20) parts of crystallized sodium acetate in about four hundred and fifty (450) parts of water, the temperature of which solution should be about 0° centigrade. After stirring for about an hour about nine (9) parts of calcined soda are added, and the stirring is continued for three or four days. The coloring-matter which may have partly separated out is then completely precipitated with common salt, collected and pressed, and purified by repeatedly redissolving in hot water and reprecipitating with common salt. The dye-stuff is a reddish-brown powder, easily soluble in hot water, rather less soluble in cold, soluble in alcohol with a more yellowish color than in water, insoluble in benzine. An aqueous solution (one one-thousandth) upon treatment with an equal volume of acetic acid (thirty per cent.) yields a dirty purple solution, and after standing a precipitate of the same color. By adding to a similar aqueous solution an equal volume of hydrochloric acid (twenty-five per cent. HCl) a blue precipitate is at once obtained. It dyes cotton directly from the alkaline or soap bath a brilliant scarlet color without the aid of a mordant.

I am aware that red dye-stuffs which fix themselves on cotton without the aid of a mordant have been prepared from benzidine and ortho-tolidine by combination of the same with naphthionic acid; but I am not aware that orthometa-tolidine has been used for this purpose. Indeed, it has up to the present time been regarded as a natural law that meta derivatives of benzidine could not yield dyes of this nature. (*Schultz Chemie. des Stein Kohlen theers*, 2d Edit., vol. 2, p. 258. *Weingärtner, Chemiker Zeitung*, March 25, 1888, No. 25.)

My hereinbefore-described new dye-stuff differs essentially from the above-mentioned derivatives of benzidine and ortho-tolidine, e known in commerce respectively
o" and "benzopurpurine," in that
tton a decidedly yellower tint of red.
I claim as new, and desire to secure
s Patent, is— ew composition of matter, the here-
described diazo dye-stuff which re-
n the combination of two molecules
hionic acid with one molecule of the
erivative obtained by the action of
cid on orth....eta-toluidine, and which
terized by the following properties:
ddish-brown powder easily soluble in
r, slightly less soluble in cold, soluble
ol with a more yellowish color than
, insoluble in benzine; an aqueous
(one one-thousandth) upon treatment
with an equal volume of acetic acid (thirty per cent.) yields a purple solution, and after standing a precipitate of the same color; hydrochloric acid (twenty-five per cent.) gives at once a blue precipitate from the same solution, and the dye-stuff dyes cotton in the alkaline bath without the aid of a mordant a brilliant red color with a slightly-yellow shade, all substantially as described.

In testimony whereof I have hereunto set my hand in the presence of two subscribing witnesses.

GEORG KOERNER.

Witnesses:
 CONRAD SCHRAUBE,
 HERMANN HAUZ.

Corrections in Letters Patent No. 429,350.

Affidavit having been filed showing that no foreign patent had been granted for the invention described in the specification annexed to Letters Patent No. 429,350, granted June 3, 1890, upon the application of Georg Koerner, of Ludwigshafen-on-the-Rhine, Bavaria, Germany, for an improvement in "Red Dyes," previous to the date of granting said patent, it is hereby certified that the words "subject to the limitation prescribed by Section 4887, Revised Statutes, by reason of German patent dated March 22, 1889, and English patent dated August 27, 1889, No. 13,558," at the end of the grant, the words and figures "Patented in Germany March 22, 1889, and in England August 27, 1889, No. 13,558," at the head of the specification, and the words and figures "for which I have obtained Letters Patent in Great Britain, No. 13,558, dated August 27, 1889, and in Germany, dated March 22, 1889," in lines 9, 10, and 11 of page 1 of the printed specification should be stricken out, and that the said Letters Patent should be read with these corrections therein that the same may conform to the record of the case in the Patent Office as corrected.

Signed, countersigned, and sealed this 29th day of July, A. D. 1890.

[SEAL.]

CYRUS BUSSEY,
*Assistant Secretary of the Interior.*

Countersigned:

C. E. MITCHELL,
*Commissioner of Patents.*